United States Patent Office 3,036,108
Patented May 22, 1962

3,036,108
ALKYLENE AMINO PHOSPHONIC ACID
CHELATING AGENTS
Albert E. Frost, Seaford, N.Y., assignor to The Dow Chemical Company, Midland, Mich., a corporation of Delaware
No Drawing. Filed Dec. 2, 1958, Ser. No. 777,571
9 Claims. (Cl. 260—461)

This invention relates to a new class of chelating agents generally described as alkylenebis (iminosalicylidene) diphosphonic acids, and a method for their production.

Chelating agents suitable for reaction with heavy metals are extremely useful entities and it is a fundamental object of this invention to provide a chemical structure in an alkylenebis (iminosalicylidene) diphosphonic acid which is characterized by its having spaced nitrogen atoms relative to phosphonic acid and ortho-hydroxyphenyl groups and so oriented with respect to each other as to present a maximum number of potential ligands in a polydentate structure. The structure is such that the material is a highly effective water soluble chemical compound, well adapted to the chelation of many metals, such as iron, and its effectiveness extends over a wide range of pH.

Other objects and advantages of the invention will in part be obvious and in part appear hereinafter.

The invention accordingly, is embodied in a group of chemical compounds characterized by their having a structure corresponding to the following generalized drawing:

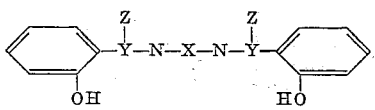

wherein X represents a central alkylene or cycloalkylene spacer group which spaces the indicated nitrogen atoms 2-3 carbon atoms apart and may be typically ethylene, trimethylene, methylethylene, dimethylethylene, and similar alkylene substituted ethylenes and trimethylenes, as well as cyclo hexylene and cyclo pentylene. The function of the X group in this structure is merely that of spacer and the degree of spacing preferred is 2-3 carbon atoms so that an optimum 5 or 6 member combination is available for forming the fused chelate ring when the compound reacts with the polyvalent metal.

Y represents an alkylene spacer group which may be methylene or ethylene interposed between the nitrogen and the phenyl group to obtain a 1-2 carbon atom spacing between the indicated nitrogens and aromatic group so that the hydroxyl group in the ortho position of the phenyl ring is available for chelation. The two Y positions need not be identical, but, as an operating matter, they usually will be.

Z represents a phosphonic acid group in which the phosphorous is directly attached to a carbon of the Y spacer group, the phosphonic acid group being either the free acid, or the simple methyl, ethyl, propyl or butyl ester, in either the mono or the diester form. High alkyl esters may be used, but no advantage is derived therefrom in that the function being sought is the chelation function and it is best obtained with the free acid, and simple monoester and the simple diester.

Polymers of the simple alkylenediamine used to link the terminal salicyl groups may be used so that X may actually represent an alkylene N-alkylene structure in polymer form so that the ultimate compound is characterized by repetition of this internal form through 1, 2, 3 or 4 units, e.g., as follows:

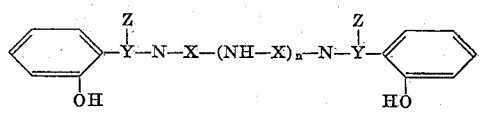

$n$ being 0, 1, 2, 3, 4.

Typical compounds corresponding to the drawing given are the following:

(1) Ethylenebis (iminosalicylidene) di-phosphonic acid:
(a) Mono ethyl ester
(b) Di ethyl ester
(c) Tri ethyl ester
(d) Tetra ethyl ester (2) Trimethylenebis (iminosalicylidene) di-phosphonic acid:
(a) Mono ethyl ester
(b) Di ethyl ester
(c) Tri ethyl ester
(d) Tetra ethyl ester The invention may be better understood by reference to the following specific examples describing details of the synthesis:

EXAMPLE I

Ethylenebis (iminosalicylidene) di-phosphonic acid, diethyl ester.

12 parts of α,α'-ethylenedinitrilo-di-o-cresol and 98.4 parts of diethyl hydrogen phosphite (1–16 molar ratio) were mixed and heated to 155–165° C. for ¾ hour. The mixture was cooled, filtered to remove a small amount of off-white solid, and the filtrate added to five volumes of acetone, whereupon a pale yellow solid precipitated. Filtration and trituration of the product with acetone gave an off-white powder which did not melt below 285° C. (58 percent).

Product

| Analysis | Percent C | Percent H | Percent N | Percent P |
|---|---|---|---|---|
| Calculated | 49.18 | 6.19 | 5.74 | 12.69 |
| Found | 49.26 | 6.14 | 5.76 | 12.77 |

Stoichiometric ratios (1–2) of reactants and variations of ratios yield this same product.

EXAMPLE II

Ethylenebis (iminosalicylidene) di-phosphonic acid, tetraethyl ester.

A mixture of 11.9 parts of α,α'-ethylenedinitrilo-o-cresol and 13.8 parts (1–2 molar ratio) of diethyl hydrogen phosphite was allowed to stand for one week at room temperature. The yellow amorphous mass was then taken up in alcohol and ether added to precipitate a pale yellow solid, the tetraethyl ester.

Its properties: melting point 125–135° C. (rapid heating); slow heating, no melting occurred below 290° C. with rapid heating, melting occurred at 125–135° C. to a viscous yellow oil which with continued heating, became a solid which did not melt below 290° C. This same compound was obtained by using a 1–4 mole ratio of reactants.

EXAMPLE III

Ethylenebis (iminosalicylidene) di-phosphonic acid, free acid.

Hydrolysis of the diethyl or tetraethyl esters of the compounds of Examples I and II with 48 percent HBr gave a pink solid, the free diphosphonic acid. The acid can be isolated by evaporation or by neutralization of the hydrolyzate. It is soluble in alkalies and acids and insoluble in water and organic solvents. Alkaline hydrolysis may also be used. Molecular weight as determined from potentiometric titration data was 453.0 (432.3 theory). In like manner, hydrolysis of the reaction mixtures leading to the diethyl or tetraethyl esters without separation of the esters produces the acid. The acids are difficult to purify.

EXAMPLE IV

Trimethylenebis (iminosalicylidene) di - phosphonic acid.

A measured portion of α,α'-(trimethylenedinitrilo)-di-o-cresol dissolved almost immediately in dimethyl and diethyl hydrogen phosphite to give a clear yellow solution, whereas α,α'-(ethylenedinitrilo)-di-o-cresol formed a slurry. Hydrolysis of the reaction mixture after several hours at room temperature with 48 percent HBr gave trimethylenebis (iminosalicylidene)-di-phosphonic acid as an off-white powder, M.P. 277–9° C. (dec.).

EXAMPLE V

Ethylenebis (iminosalicylidene) di-phosphonic acid from reaction mixture of α,α-ethylenedinitrilo-di-o-cresol with diethyl hydrogen phosphite.

To 26.8 parts of α,α-ethylenedinitrilo-di-o-cresol there were added 55.2 parts of diethyl hydrogen phosphite and the resulting slurry stirred for ½ hour. After standing overnight, the slurry was heated for 5 hours on the steam bath to give a clear yellow-green, viscous mass. 85 milliliters of 48.8 percent HBr were added and the mixture refluxed for 8 hours then evaporated to dryness. The viscous red residue was taken up in a small volume of water and acetone added to precipitate the acid as a pink solid. It may be recrystallized from hot water in which it is difficultly soluble. M.P.>285° C., yield: 19.8 parts≡46 percent.

EXAMPLE VI

Trimethylenebis (iminosalicylidene) di-phosphonic acid:

(a) Tetraethyl ester: A mixture of 14.1 parts α,α'-trimethylenedinitrilo-di-o-cresol and 20.7 parts diethyl hydrogen phosphite (1–3 molar ratio) was heated to 45–50° C. for 2 hours then allowed to stand overnight. The addition of 1 liter of acetone precipitated the tetraethyl ester as a pale yellow powder. 21 parts≡75 percent.

(b) Tetramethyl ester: The same procedure as "a" above but using dimethyl hydrogen phosphite as the nucleophilic agent gave the tetramethyl ester in 58 percent yield.

(c) Diethyl ester: 14 parts of α,α'-trimethylenedinitrilo-di-o-cresol and 20.7 parts diethyl hydrogen phosphite were heated to reflux for 15 minutes then cooled and filtered. The addition of 5–10 volumes of acetone precipitated a pale-yellow hydroscopic powder. M.P. >285° C., 13.5 parts≡55 percent.

(d) Hydrolysis of reaction mixture "a" above, prior to separation of the tetraethyl ester using 48.8 percent HBr as in Example I gave the free acid as a pink solid, 5.5 parts≡22 percent yield.

In the synthesis of those compounds having two carbon atoms between the aromatic ring and the nitrogen atom (Y position in the drawing) compounds paralleling those of Examples I–VI are obtained by starting with a β-orthohydroxy phenyl acetaldehyde which is condensed with the appropriate diamine and then the condensed compound reacted with the appropriate phosphite. Thus, following the procedure of Example I, β-orthohydroxyphenyl acetaldehyde is condensed with ethylenediamine to produce

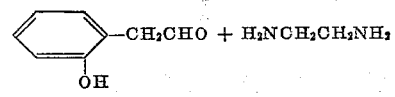

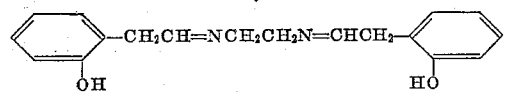

Thereafter reaction with diethyl phosphite, for example, produces

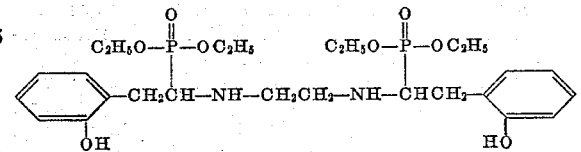

Any of the Examples I through VI may be varied to produce compounds having the 2-carbon atom spacing between the aromatic ring and the nitrogen atom in the same manner.

The tetra alkyl esters of these compounds in general are off-white powders which are soluble in water and common organic solvents such as methanol, acetone, ethanol, methyl ethyl ketone. They are, however, insoluble in ethyl ether and they react with acids and bases.

The di-alkyl esters are off-white powders insoluble in common organic solvents and water, but soluble in acids and bases due to their hydrolysis. The free acids are somewhat off-white in color and may appear as pink powders. They are quite soluble in acids and alkalies and insoluble in organic solvents.

No chemical advantage in the chelating properties of the compounds is obtained from the fact that the phenyl rings carry substituents, such as chlorine, alkyl, nitro or amino group. Such substituents on the ring have the general effect of lowering the solubility of the compound in water and may even adversely affect the chelating ability of the compounds depending upon their location and electron attracting or donating properties.

All the products, esters, half esters, and acids form deep wine-red complexes with trivalent iron, blue complexes with copper in acid solution, blue-green complexes with copper in alkaline solution, and colorless calcium complexes in alkaline solution. It is assumed that the tetra ethyl ester compound hydrolyzes easily to the di ester form at least to permit the complex or the chelate formation. This hydrolysis probably being expedited by the presence of the metal in the solution.

It is difficult to formulate an exact structure for the chelate complex. However, it appears that the exact structure will depend upon the metal and the pH of the solution in which the complex is found and the extent of the involvement of the phosphonic acid group. The phosphonic group is probably not involved in the formation of the chelate in strongly acid solutions. However, it seems to be involved in chelate formation as the neutral solution or moderate acid range is approached; at alkaline pH's and in the high alkaline ranges, the phosphonic acid groups appear to be involved in the chelate formation.

The following formula represents the postulated structure for an $Fe^{III}$ chelate:

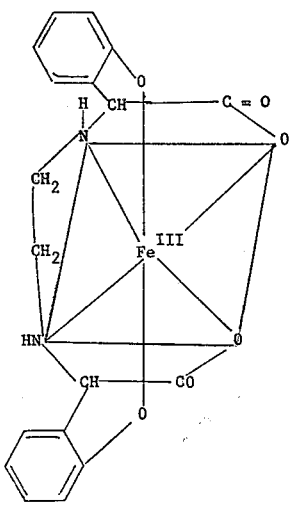

The compounds are quite efficient chelating agents for polyvalent metal ions and wherever it is desired to form the chelate of one of these ions in solution, particularly the transition metal ions, this can be done. They are particularly effective for chelating iron.

What is claimed is:

1. A chemical compound having a structure given by the following:

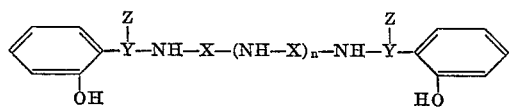

wherein, X represents a chemical moiety selected from the group consisting of alkylene and cycloalkylene which interpose 2-3 carbon atoms between the indicated nitrogen atoms; Y represents a chemical moiety selected from the group consisting of —$CH_2$— and —$CH_2$—$CH_2$—; Z represents a phosphonic acid moiety selected from the group consisting of —$PO_3H_2$ and its alkali metal and ammonium base salts; —$PO_3H$ alkyl and its alkali metal and ammonium base salts and —$PO_3$ (alkyl)$_2$ in which the alkyl ester portion of the molecule is a moiety which includes 1–18 carbon atoms; n represents an integer having a value in the range 0–3.

2. A compound corresponding to the following formula:

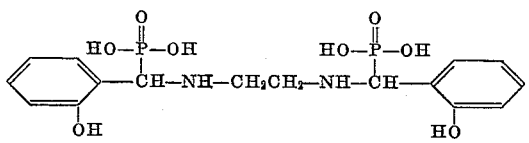

3. A compound corresponding to the following formula:

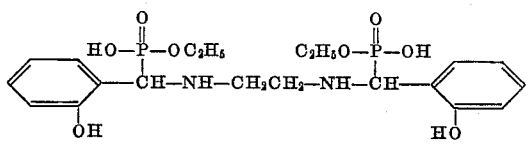

4. A compound corresponding to the following formula:

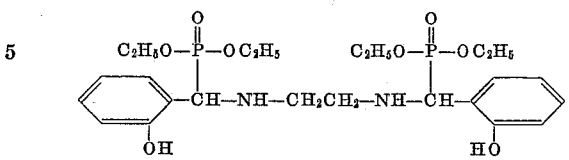

5. A compound corresponding to the following formula:

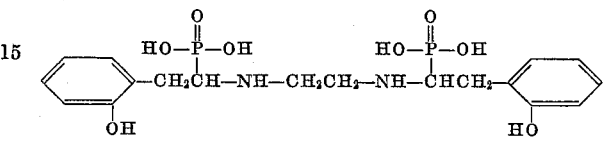

6. A compound corresponding to the following formula:

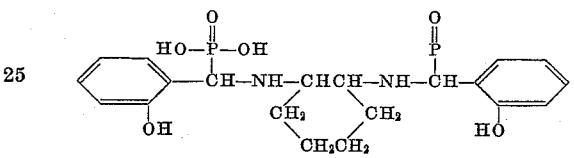

7. A compound corresponding to the following formula:

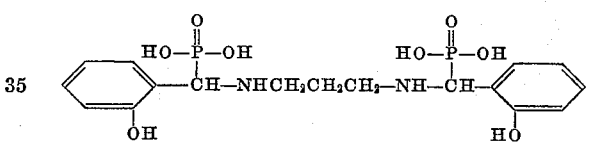

8. A compound corresponding to the following formula:

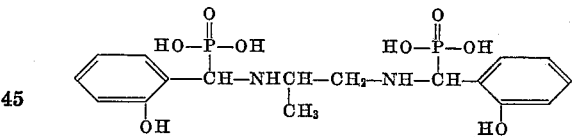

9. A compound corresponding to the following formula:

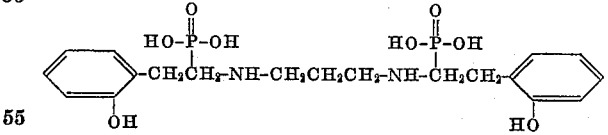

References Cited in the file of this patent
UNITED STATES PATENTS

| | | |
|---|---|---|
| 2,268,157 | Marvel | Dec. 30, 1941 |
| 2,328,358 | Pikl | Aug. 31, 1943 |
| 2,586,656 | Hook | Feb. 19, 1952 |
| 2,635,112 | Fields | Apr. 14, 1953 |
| 2,841,606 | Hechenbleikner et al. | July 1, 1958 |
| 2,870,190 | Burgert et al. | Jan. 20, 1959 |